United States Patent
Holme et al.

(10) Patent No.: US 9,272,217 B1
(45) Date of Patent: *Mar. 1, 2016

(54) SYSTEM AND METHOD FOR PROVIDING NOTIFICATIONS TO PLAYERS OF GAMES

(75) Inventors: Kevin Holme, Allen, TX (US); Andy Gotcher, Prosper, TX (US); Tim Terence Trampedach, San Francisco, CA (US); Ananda Ghosh, Oakland, CA (US); Jane Shapiro, Boston, MA (US)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/150,738

(22) Filed: Jun. 1, 2011

(51) Int. Cl.
*A63F 13/30* (2014.01)
*A63F 13/48* (2014.01)
*A63F 13/79* (2014.01)

(52) U.S. Cl.
CPC ............. *A63F 13/30* (2014.09); *A63F 13/48* (2014.09); *A63F 13/79* (2014.09); *A63F 2300/406* (2013.01); *A63F 2300/407* (2013.01); *A63F 2300/537* (2013.01); *A63F 2300/5546* (2013.01)

(58) Field of Classification Search
CPC ......... A63F 13/30; A63F 13/48; A63F 13/79; A63F 2300/406; A63F 2300/407; A63F 2300/537; A63F 2300/572; A63F 2300/5546
USPC .......................................... 463/30, 33, 40–42
See application file for complete search history.

(56) References Cited

U.S. PATENT DOCUMENTS

| | | | |
|---|---|---|---|
| 8,764,568 B2 | 7/2014 | Holme et al. | |
| 2010/0216553 A1* | 8/2010 | Chudley et al. | 463/42 |
| 2010/0317442 A1* | 12/2010 | Thomas et al. | 463/42 |
| 2011/0010305 A1* | 1/2011 | Aleong et al. | 705/319 |
| 2011/0161791 A1* | 6/2011 | Travis et al. | 715/205 |
| 2012/0309540 A1 | 12/2012 | Holme et al. | |

OTHER PUBLICATIONS

Caoili, E. Facebook's New Games, Apps Dashboards Curtail Notification Spam [online], Jan. 22, 2010 [retrieved on Dec. 22, 2011]. Retrieved from the Internet <URL: http://www.gamasutra.com/view/news/26920/Facebooks_New_Games_Apps_Dashboards_Curtail_Notification_Spam.php>.*

Shaul, B. Hey Facebook, there's a Game Request in my Notifications Bar! [online], Dec. 10, 2010 [retrieved on Dec. 22, 2011]. Retrieved from the Internet <URL: http://blog.games.com/2010/12/10/hey-facebook-theres-a-game-request-in-my-notifications-bar/>.*

Apps on Facebook.com [online], [retrieved on Dec. 22, 2011]. Retrieved from the Internet <URL: http://web.archive.org/web/20101205130416/http://developers.facebook.com/docs/guides/canvas/>.*

"Apps on Facebook", Retrieved Dec. 22, 2011 from <URL:http://web.archive.org/web/20101205130416/http://developers.facebook.com/docs/guides/canvas/>, (2010), 7 pgs.

(Continued)

*Primary Examiner* — Dmitry Suhol
*Assistant Examiner* — David Duffy
(74) *Attorney, Agent, or Firm* — Schwegman Lundberg & Woessner, P.A.

(57) ABSTRACT

A system, computer-readable storage medium sorting at least one program, and a computer-implemented method for providing notifications to players of games are described. An identifier for a player of a first game is received. Notifications for at least one other game are obtained using the identifier for the player. The notifications for the at least one other game are transmitted to a device of the player, where the notifications for the at least one other game are to be displayed in a user interface for the first game.

11 Claims, 8 Drawing Sheets

(56) References Cited

OTHER PUBLICATIONS

"OpenFeint to Select 100 Paid Games for User Based Cross Promotion With "One Touch iPromote"", [Online]. Retrieved from the Internet: <http://www.marketwire.com/printer_friendly?id=1231793 > Accessed on Jun. 8, 2011, (Apr. 21, 2009), 3 pgs.

"With iPhone OS 3.0 Launch Tomorrow, OpenFeint Announces Support for Push Notifications and Microtransactions in Applications", [Online]. Retrieved from the Internet: <http:www.marketwire.com/printer_friendly?id=1221851 > Accessed on Jun. 8, 2011, (Jun. 17, 2009), 3 pgs.

Caoili, Eric, "Facebook's New Games, Apps Dashboards Curtail Notification Spam", Gamasutra Website, http://www.gamasutra.com/view/news/26920/Facebook_New_Games_Apps_Dashboards_Curtail_Notification_Spam.php, (Jan. 2010), 2 pgs.

Marceau, E, "WWDC 2011: Apple Announces Improved Game Center", [retrieved on Jun. 8, 2011]. Retrieved from the Internet: <URL: http://appleigaga.com/iphone-ipad-ipod/iphone/wwdc-2011-apple-announces-improved-game-center.html?quick_view=1 >, (Jun. 8, 2011), 2 pgs.

Schramm, Mike, "OpenFeint Announces iPromote, Readies to Take Over iPhone Gaming", Retrieved from the Internet: <URL http://www.tuaw.com/2009/04/27/openfeint-announces-ipromote-readies-to-take-over-iphone-gaming/ > Accessed on Jun. 8, 2011, (Apr. 27, 2009), 2 pgs.

Shaul, Brandy, "Hey Facebook, there's a Game Request in my Notifications Bar!", [Online]. Retrieved Dec. 22, 2011, from the Internet: <http://www/gamasutra.com/view/ndews/26920/Facebooks_New_Games_Apps_Dashboards_Durtail_Notification_Spam.php>, (Dec. 10, 2010), 3 pgs.

Squires, J., "Game Center changes coming in iOS 5", Jun. 6, 2011 [retrieved on Jun. 6, 2011]. Retrieved from the Internet: <URL: http://www.gamezebo.com/news/2011/06/06/game-center-changes-coming-ios-5 >, 2 pgs., 1 pg.

"U.S. Appl. No. 13/244,931, Examiner Interview Summary mailed Jan. 15, 2013", 3 pgs.

"U.S. Appl. No. 13/244,931, Response filed Jan. 22, 2013 to Final Office Action mailed Nov. 5, 2012", 11 pgs.

"U.S. Appl. No. 13/244,931, Non Final Office Action mailed Sep. 10, 2013", 10 pgs.

"U.S. Appl. No. 13/244,931, Notice of Allowance mailed Mar. 20, 2014", 7 pgs.

"U.S. Appl. No. 13/244,931, Response filed Feb. 10, 2014 to Non Final Office Action mailed Sep. 10, 2013", 11 pgs.

\* cited by examiner

SYSTEM AND METHOD FOR PROVIDING NOTIFICATIONS TO PLAYERS OF GAMES

TECHNICAL FIELD

The disclosed embodiments relate generally to techniques for providing notifications to players of games.

BACKGROUND

Online multiplayer games allow players to play these games without being in the same physical location. A multiplayer game may generally be classified as a synchronous multiplayer game or an asynchronous multiplayer game. A synchronous multiplayer game is a game in which the players play the game at the same time. An asynchronous multiplayer game is a game in which the players may play the game at different times. In other words, players of an asynchronous multiplayer game do not need to play the game at the same time. Thus, asynchronous multiplayer games allow players to play the games on their own schedule. Unfortunately, a first player of an asynchronous multiplayer game may not know when a second player of the asynchronous player has performed an action that requires a response from the first player (e.g., the second player made a move in the game and it is now the first player's turn to make a move).

BRIEF DESCRIPTION OF THE DRAWINGS

The embodiments disclosed in the present disclosure are illustrated by way of example, and not by way of limitation, in the figures of the accompanying drawings. Like reference numerals refer to corresponding parts throughout the drawings.

DESCRIPTION OF EXAMPLE EMBODIMENTS

The description that follows includes example systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

As discussed above, a player of a game (e.g., an asynchronous multiplayer game) may not know when the player has pending actions in the game. One solution to this problem is to send a notification to the player of the game that the player of the game has pending actions in the game. For example, an email may be sent to the player of the game notifying the player that the player has pending actions in the game. Similarly, when the player of the game logs onto the game, the game may present notifications of the pending actions for the game. Moreover, a push notification may be sent to a device of the player (e.g., a computer system, a mobile phone). The push notification may then be displayed in a user interface of the device so that that player of the game is aware that there are pending actions in the game without having to log onto the game. For example, a number may be displayed in conjunction with an icon for the game (e.g., displayed over at least a portion of the icon) being displayed in the user interface for the device of the player.

This problem is further compounded as the player plays more games. For example, the player may have multiple pending actions in multiple games. However, if the notifications of the pending actions are sent to the user via email or if the notifications are presented to the player in the user interface of the device of the player, the player must log off of a game that the user is currently playing to access notifications for the other games.

Furthermore, as more games become available, it becomes more difficult to surface new games to players (e.g., notify players of new games) while making the players aware that their friends are playing these new games.

The embodiments described herein provide notifications to players of a game without the aforementioned deficiencies.

Figure 1:
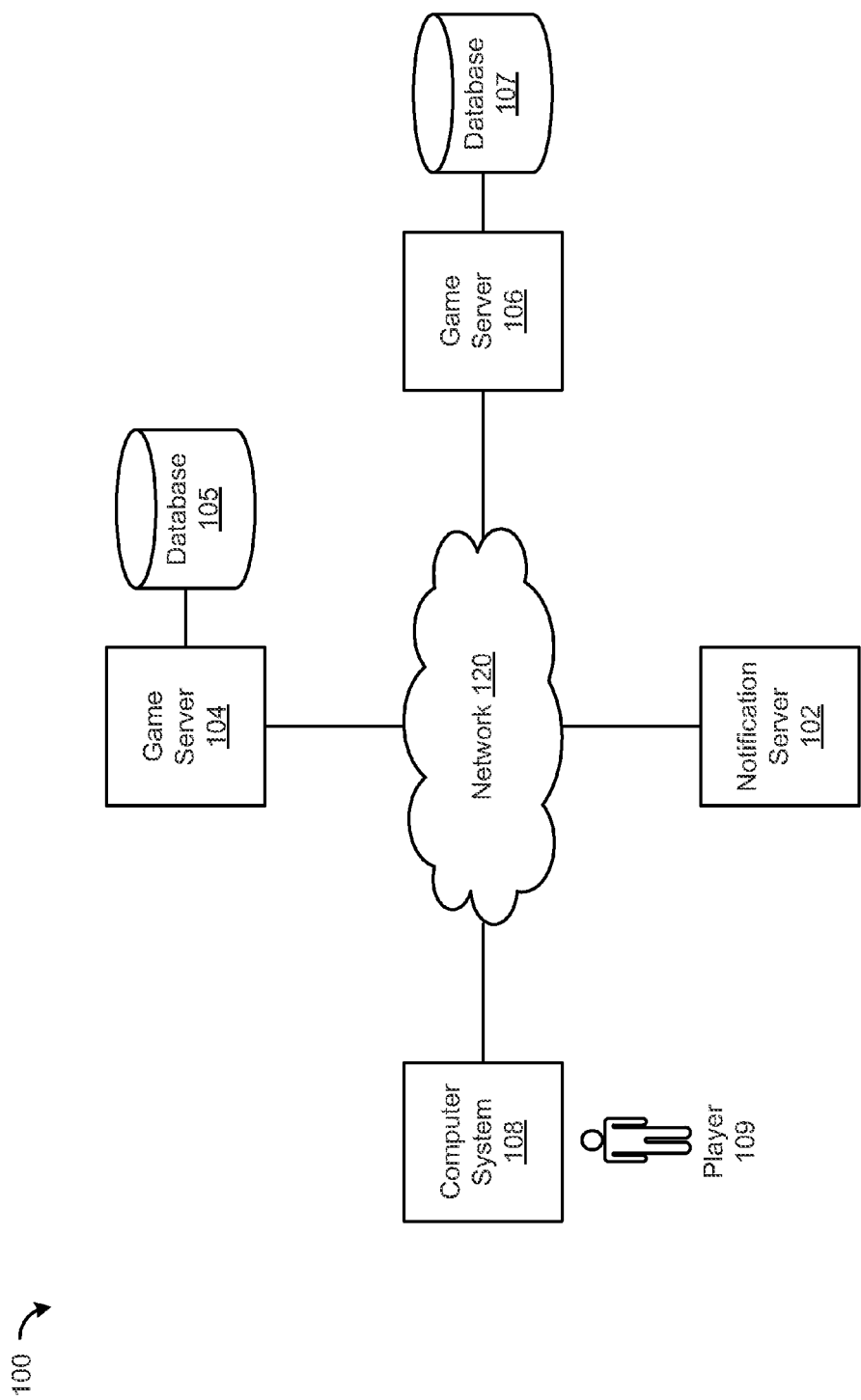
FIG. 1 is a block diagram illustrating a network system, according to some embodiments.

FIG. 1 is a block diagram illustrating a network system 100, according to some embodiments. The network system 100 includes a network 120. Network 120 can generally include any type of wired or wireless communication channel capable of coupling together computing nodes. This includes, but is not limited to, a local area network (LAN), a wide area network (WAN), or a combination of networks. In some embodiments, network 120 includes the Internet.

As illustrated in FIG. 1, a notification server 102, a game server 104, a game server 106, and a computer system 108 for a player 109 are coupled to network 120 and may communicate with each other via network 120.

The notification server 102 may receive and store notifications generated by games hosted on the game server 104 and the game server 106. The notification server 102 may transmit (or present) these notifications to the computer system 108 of the player 109.

The game server 104 may host one or more games for a game publisher. The one or more games may include synchronous multiplayer games and/or asynchronous multiplayer games. As discussed above, a synchronous multiplayer game is a game in which the players must play the game at the same time (e.g., the players must be logged into the game at the same time in order to play the game) and an asynchronous multiplayer game is a game in which the players may play the game at different times (e.g., the players do not need to be logged into the at the same time in order to play the game). The game server 104 may be coupled to a database 105 that stores data relating to players of the game and/or game states of the players of the game. In some embodiments, the database 105 is a distributed database (e.g., geographically distributed and/or distributed within a data center, etc.). In some embodiments, the database 105 is a relational database.

The game server 106 may host one or more games for another game publisher. Again, the one or more games may include synchronous multiplayer games and/or asynchronous multiplayer games. The game server 106 may be coupled to a database 107 that stores data relating to players of the game and/or game states of the players of the game. In some embodiments, the database 107 is a distributed database (e.g., geographically distributed and/or distributed within a data center, etc.). In some embodiments, the database 107 is a relational database.

The computer system 108 may include a laptop computer system, a desktop computer system, a mobile phone, a smart phone, a personal digital assistant (PDA), a gaming console, and a set top box. The player 109 may use the computer system 108 to access game hosted on the game servers 104 and 106.

Note that although FIG. 1 shows one instance for each of the notification server 102, the game server 104, the game server 106, and the computer system 108, multiple notification servers, game servers, and computer systems may be present in the network system 100. For example, each of the notification server 102, the game server 104, and the game server 106 may include a plurality of distributed servers. The plurality of distributed servers may provide load balancing and/or may provide low-latency points of access to nearby computer systems. The distributed servers may be located within a single location (e.g., a data center, a building, etc.) or may be geographically distributed across multiple locations (e.g., data centers at various geographical locations, etc.).

Also note that although the embodiments described herein refer to the notification server 102, the game server 104, the game server 106, and computer system 108, the embodiments may be applied to multiple notification servers, game servers, and computer systems. Furthermore, the functionality of any of the notification server 102, the game server 104, and the game server 106 may be implemented within a single server (or a set of distributed servers). For example, the notification server 102 and the game server 104 (and/or the game server 106) may be located on the same server (or the same set of distributed servers).

Furthermore, note that although FIG. 1 shows the game server 104 and the game server 106, other game servers for other game publishers may be present in the network system 100.

Figure 2:
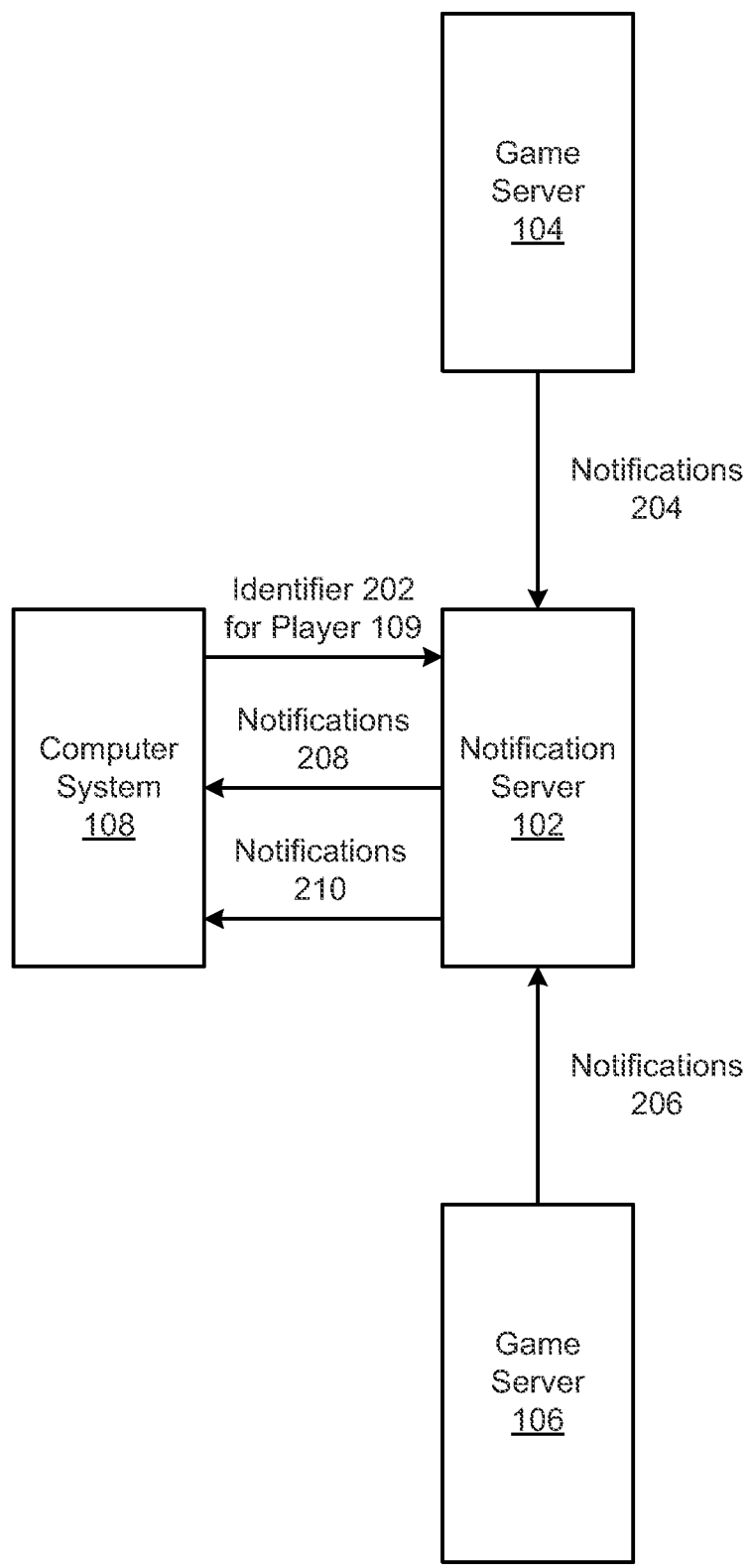
FIG. 2 is a block diagram illustrating data that is transferred between a notification server, game servers, and a computer system in the network system, according to some embodiments.

FIG. 2 is a block diagram illustrating data that is transferred between the notification server 102, the game server 104, the game server 106, and the computer system 108 in the network system 100, according to some embodiments. The notification server receives notifications 204 from a game hosted on the game server 104 and receives notifications 206 from a game hosted on the game server 106. These notifications may be received periodically in batches (e.g., once per hour) and/or may be received as the notifications are generated by games hosted on the game servers 104 and 106. The notifications 204 and 206 include notifications 208 and 210 for the player 109 as well as notifications for other players of the games hosted on the game servers 104 and 106, respectively. When the player 109 uses the computer system 108 to log into the game hosted on the game server 104, the computer system 108 sends an identifier 202 for the player 109 to the notification server 102. The notification server 102 then sends notifications 208 and 210 for the player 109 to the computer system 108, where the notifications 208 and 210 correspond to notifications for the player 109 generated by the games hosted on the game server 104 and the game hosted on the game server 106, respectively. The computer system 108 displays the notifications 208 and 210 in a user interface for the game hosted on the game server 104. In other words, the notifications for the game hosted on the game server 106 are displayed in a user interface for the game hosted on the game server 104. Thus, the player 109 may receive notifications for the game hosted on the game server 106 (e.g., a second game) in a user interface displayed on the computer system 108 for the game hosted on the game server 104 (e.g., a first game) while the player 109 is playing the game hosted on the game server 104.

These embodiments are described in more detail below with respect to FIGS. 3-7.

Figure 3:
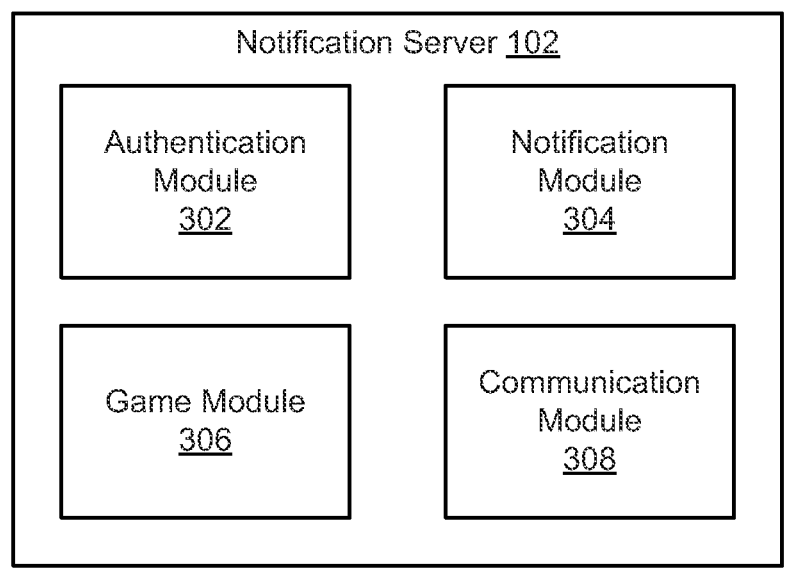
FIG. 3 is a block diagram illustrating a notification server, according to some embodiments.

FIG. 3 is a block diagram illustrating the notification server 102, according to some embodiments.

The notification server 102 includes an authentication module 302, a notification module 304, a game module 306, and a communication module 308. The authentication module 308 is configured to authenticate players of games hosted on game servers (e.g., the game servers 104 and 106) using identifiers for the players provided by the players (e.g., the identifier 202 for the player 109). The notification module 304 is configured to receive notifications from the game servers and to transmit notifications to computer systems for the players (e.g., the computer system 108). The game module 306 is configured to initialize a state of a game based at least in part on a notification for a game upon which a player has acted. The communication module 308 is configured to transmit and/or receive data and/or commands from other computer systems via network 120. The operations performed by these modules are described in more detail below with respect to FIGS. 4-7.

Figure 4:
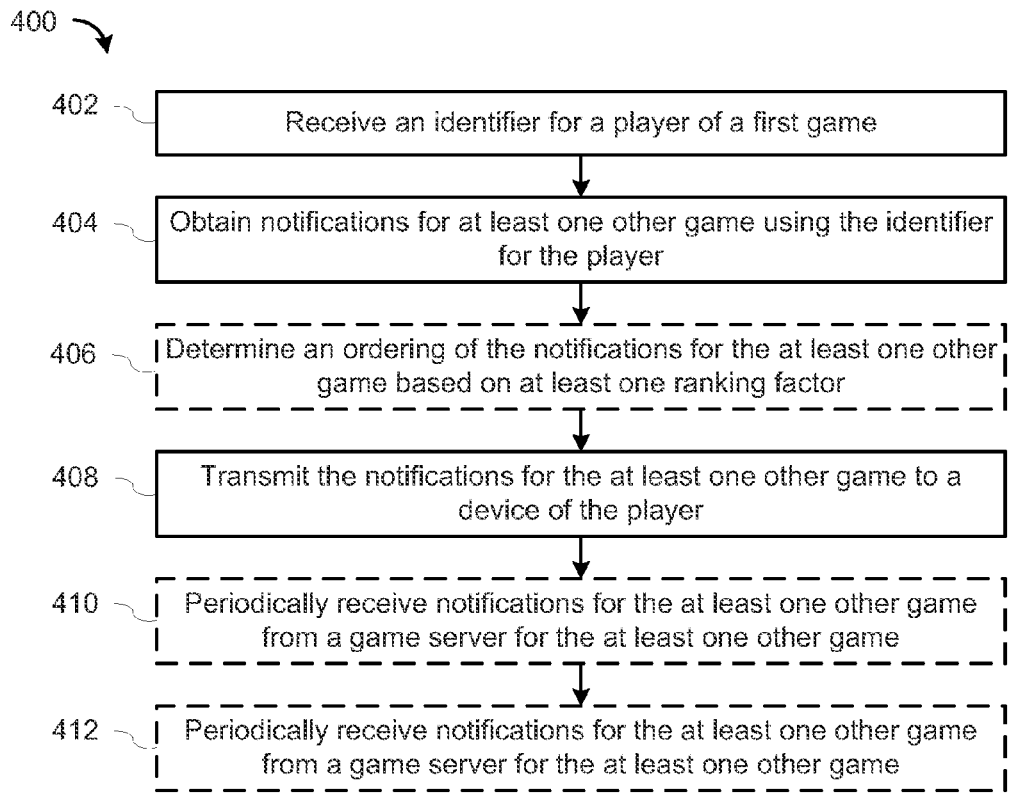
FIG. 4 is a flowchart of a method for providing notifications to players of games, according to some embodiments.

FIG. 4 is a flowchart of a method 400 for providing notifications to players of games, according to some embodiments. Note that the dashed lines are optional operations that are performed in some embodiments. The authentication module 302 receives (402) an identifier for a player (e.g., the player 109) of a first game (e.g., a poker game hosted on the game server 104).

In some embodiments, the first game is a network-based social game. A network-based social game is a game in which players play with friends in their social network. For example, the game may be played on a social networking website. In some embodiments, the first game is an asynchronous multiplayer game.

In some embodiments, the identifier for the player is a social network identifier for the player, the authentication module 302 determines player identifiers for the player corresponding to the first game and the at least one other game using the social network identifier.

The notification module 304 obtains (404) notifications for at least one other game (e.g., a puzzle game hosted on the game server 106) using the identifier for the player. In some embodiments, the at least one other game is a network-based social game. In some embodiments, the at least one other game is an asynchronous multiplayer game.

In some embodiments, the notifications notify the player of the first game that the player has pending actions to be performed in the at least one other game. In some embodiments, a notification includes one or more of: a notification of a pending move in the at least one other game, a notification of a request from another player of the at least one other game to start a new game with the player, a notification of a request from another player of the at least one other game to start a new game with the player, where the player has not previously played the at least one other game, and a notification of a message sent from another player of the at least one other game to the player. Note that the notifications may also include notifications for the first game (e.g., the game that the player is currently playing).

Figure 9A:
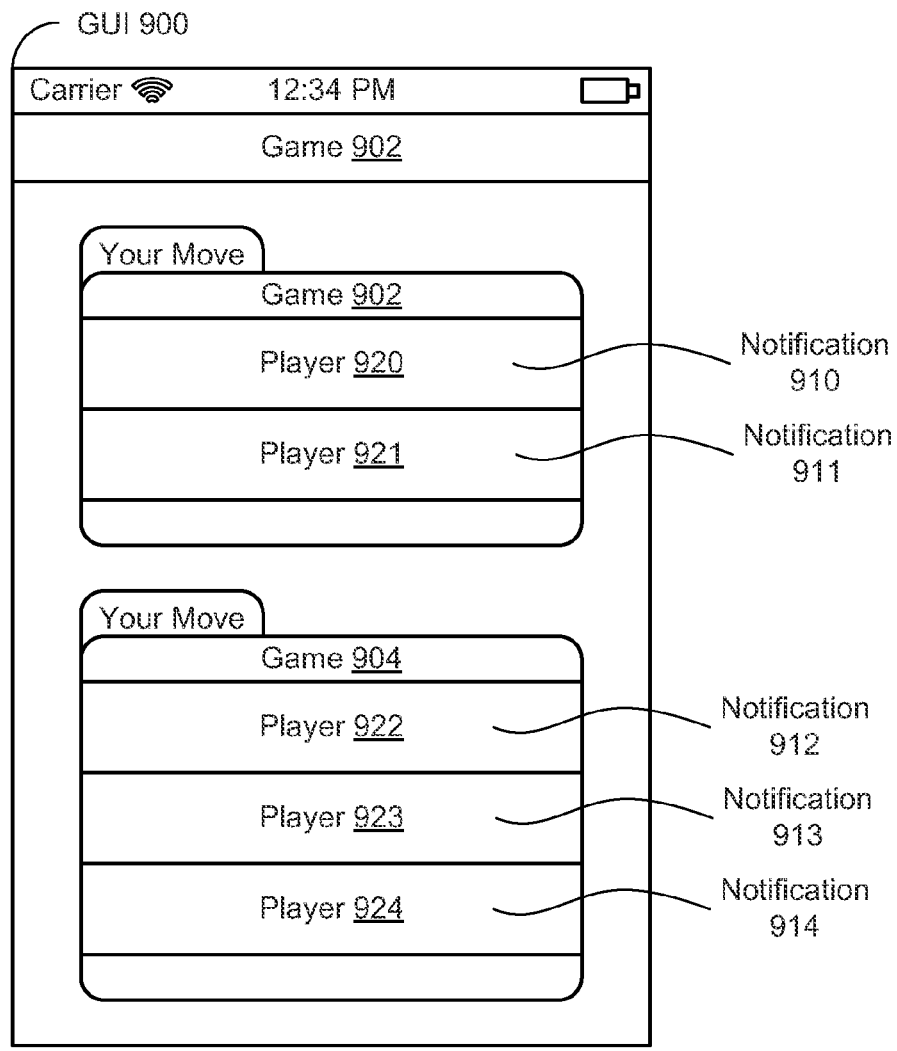
FIG. 9A is an example screenshot of a graphical user interface for a computer system of a player, according to some embodiments.
Figure 9B:
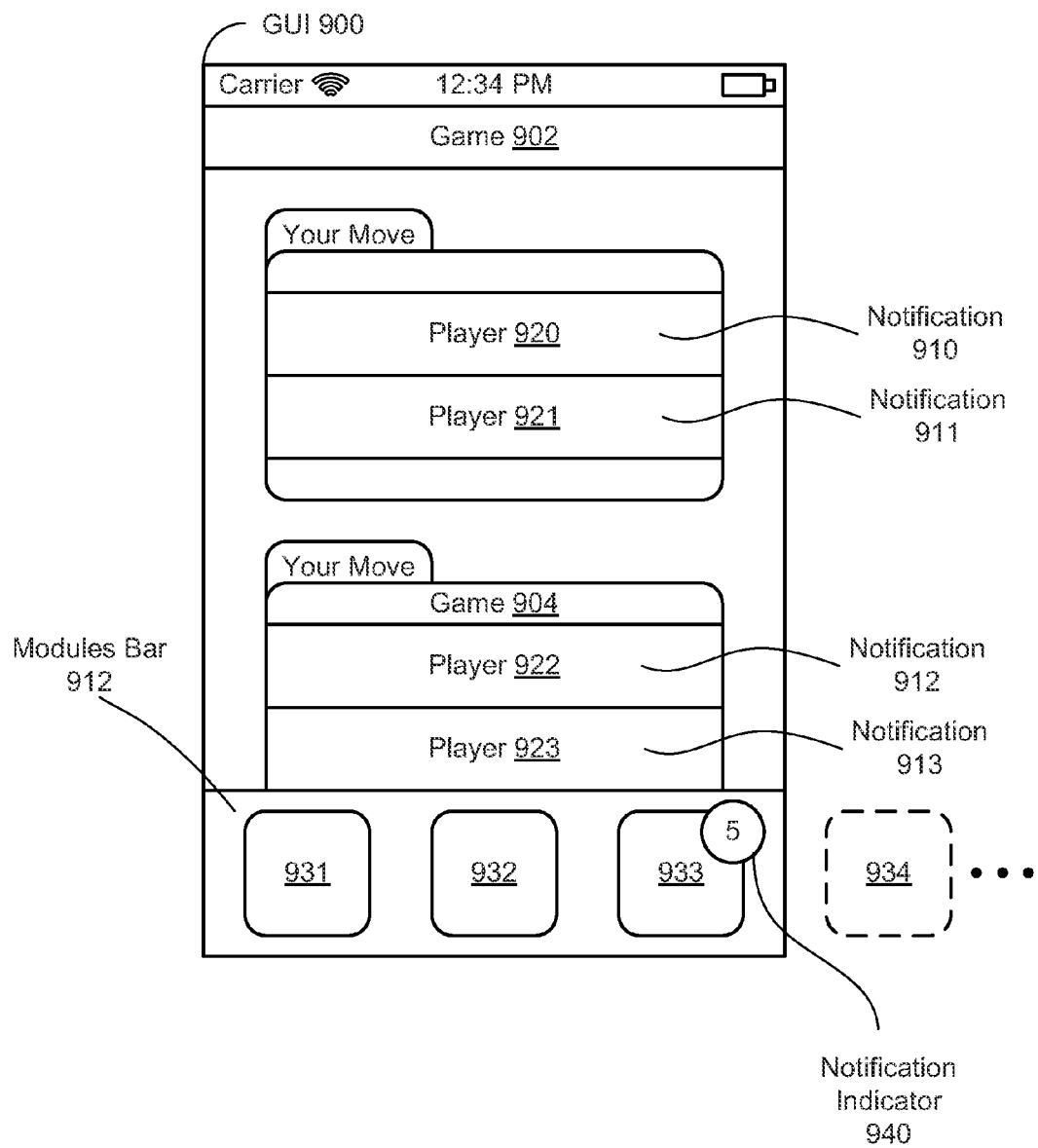
FIG. 9B is an example screenshot of a graphical user interface for a computer system of a player, according to some embodiments.

The notification module 304 transmits (408) the notifications for the at least one other game to a device of the player (e.g., the computer system 108), where the notifications for the at least one other game (e.g., the game hosted on the game server 106) are to be displayed in a user interface for the first game (e.g., the game hosted on the game server 104). In some embodiments, the device for the player is a mobile device (e.g., a smartphone). FIG. 9A is an example screenshot of a graphical user interface (GUI) 900 for the computer system 108 of the player 109, according to some embodiments. The GUI 900 includes a game interface for a game 902 that is hosted on the game server 104. The game interface displays notifications 910-911 for the player 109 in the game 902 and notifications 912-914 for the player 109 in the game 904 that is hosted on the game server 106. In this example screen shot, the notifications 910-911 indicate that the player 109 has moves in the game 902 that includes players 920 and 921, and the notifications 922-924 indicate that the player 109 has moves in the game 904 that includes players 922, 923, and 924. FIG. 9B is another example screenshot of the GUI 900 for a computer system of a player, according to some embodiments. As illustrated in FIG. 9B, the game interface for the game 902 may include a modules bar 912 usable by the player 109 to easily access modules 931, 932, and 933. Note that although the modules bar 912 is shown as a rectangular bar superimposed in the game interface for the game 902, the modules bar 912 may be any shape and may be located in any orientation and/or location within the game interface for the game 902. As illustrated in FIG. 9B, the module 933 includes a notification indicator 940 that displays a number of notifications that the player 109 has with respect to the module 933. For example, the module 933 may be another game hosted on another game server. The notification indicator may be superimposed on any module in the module bar 912. When the player 109 selects a module from the module bar 912, the module may be executed on the computer system 108 and the corresponding notifications for that module may be displayed in the user interface for the module. FIG. 9B also illustrates that the module bar 912 may be scrollable. For example, module 934 is not displayed in the game interface for the game 902, but may be displayed if the player 109 scrolls the modules in the module bar 912 to the left. Note that in general, any number of modules may be included in the module bar 912 and may be positioned inside of the viewable area of the game interface for the game 902 (e.g., within the boundaries of a display device for the computer system 108) and/or outside of the viewable area of the game interface for the game 902 (e.g., outside of the boundaries of a display device for the computer system 108).

When the user interface for the game is limited in size, only a subset of the notifications for the at least one other game may be displayed in the user interface for the game. For example, only three notifications may be displayed in the user interface for a game that is being played on a mobile device (e.g., a smartphone). Accordingly, it is desirable to display notifications for which the player is likely to be interested. Thus, in some embodiments, prior to transmitting the notifications for the at least one other game to a device of the player, the notification module 304 determines (406) an ordering of the notifications for the at least one other game based on at least one ranking factor. In these embodiments, the notifications are to be displayed in the user interface for the first game in the determined ordering. For example, the player may have notifications for the poker game, the puzzle game, a farming game, and a city-building game. The notification module 304 may use the at least one ranking factor to order the notifications so that the notifications are displayed in the following order: the notifications for the poker game are displayed first, followed by the notifications for the city-building game, the farming game, and the puzzle game. Note that a device of a player (e.g., the computer system 108) may also determine the ordering of the notifications for the at least one other game based on the at least one ranking factor. The ordering that the computer system 108 determines may be in addition to and/or in lieu of the ordering determined by the notification module 304 on the notification server 102. For example, a ranking factor may cause a notification for game that is installed on the computer system 108 to be ranked higher than a notification for a game that is not installed on the computer system 108. If the player 109 has notification for games A, B, C, and D but has only installed game B on the computer system 108, the notifications may be ordered so that the notifications for game B appear first in the list of notifications.

In some embodiments, the at least one ranking factor includes one or more of whether the player is an existing player of the at least one other game, a release date of the at least one other game, a number of actions to be performed by the player in the at least one other game, ages of the notifications, whether the notifications are associated with a friend of the player, a number of actions to be performed by the player with respect to particular players of the at least one other game, a frequency that the player plays the at least one other game with particular players associated with the notifications, a frequency that the player plays the at least one other game, a number of players that play the at least one other game, a number of friends of the player that play the at least one other game, and whether the player has installed the at least one other game on a computer system for the player (e.g., the computer system 108). The weightings of these factors may be adjusted to encourage certain behavior from the player. For example, when a new game is released, the weighting for the factor based on the release date of the at least one other game may be increased to encourage the player to play the new game.

In some embodiments, the notification module 304 periodically receives (410) notifications for the at least one other game from a game server for the at least one other game. For example, the notification module 304 may receive batches of notifications for the at least one other game every hour. In some embodiments, the notification module 304 receives (410) notifications for the at least one other game from the game server for the at least one other game as the notification are generated by the game hosted on the game server for the at least one other game.

Figure 5:
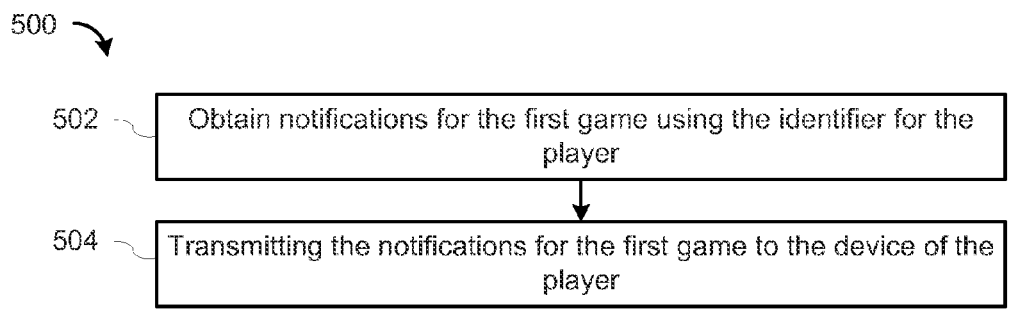
FIG. 5 is a flowchart of another method for providing notifications to players of games, according to some embodiments.

In some embodiments, the notification module 304 periodically receives (412) notifications for the first game from a game server for the first game. In some embodiments, the notification module 304 receives (410) notifications for the first game from the game server for the first game as the notification are generated by game hosted on the game server for the first game. FIG. 5 is a flowchart of a method 500 for providing notifications to players of games, according to some embodiments. The notification module 304 obtains (502) notifications for the first game using the identifier for the player and transmits (504) the notifications for the first game to the device of the player, where the notifications for the first game are to be displayed in the user interface for the first game.

Figure 6:
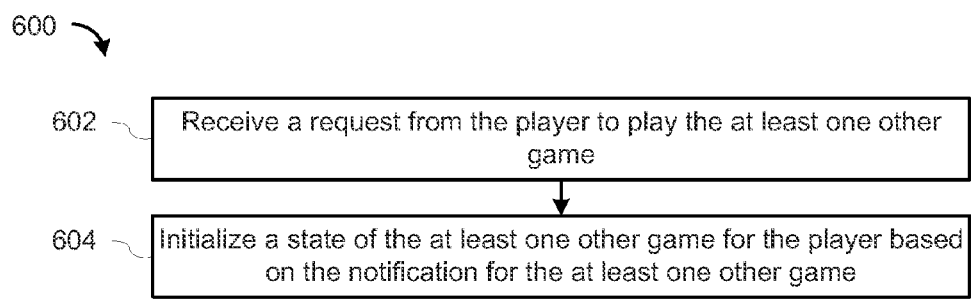
FIG. 6 is a flowchart of a method for initializing a game, according to some embodiments.

In some embodiments, the player is not an existing player of the at least one other game. For example, if the first game is a puzzle game and the at least one other game is a poker game, the player may be an existing player of the puzzle game, but may not be an existing player of the poker game. However, the embodiments described herein allow notifications of pending actions in the poker game to be presented to the player while the player is playing the puzzle game. This situation may arise, for example, when a friend of the player that is playing a poker game decides to create a new poker game that includes the player. In response to receiving the notification that the player has a pending action in the poker game, the player may decide to join the poker game that was started by the friend of the player. FIG. 6 is a flowchart of a method 600 for initializing the at least on other game when the player is not an existing player of the at least one other game, according to some embodiments. The game module 306 receives (602) a request from the player to play the at least one other game, wherein the request is received in response to the player accessing a notification for the at least one other game. The game module 306 then initializes (604) a state of the at least one other game for the player based on the notification for the at least one other game. For example, the game module 306 may setup an account for the player on the game server 106, may direct the computer system 108 to the game server in order to download and/or install the at least one other game hosted on the game server 106, and/or may direct the computer system 108 to access the at least one other game hosted on the game server 106.

Figure 7:
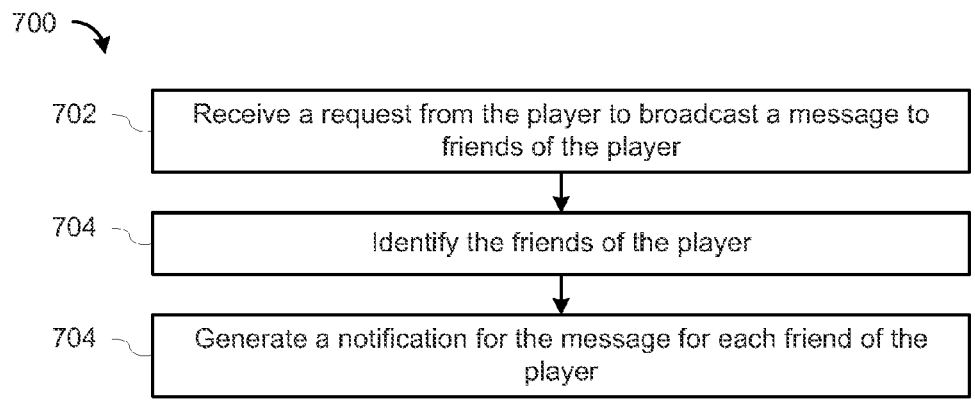
FIG. 7 is a flowchart of a method for broadcasting messages to players of a game, according to some embodiments.

While playing a game, the player may desire to send a message to friends of the player. For example, the player may request that the player's friend send particular items required in the game or may request that the player's friend assist the player in completing in-game tasks for the game. FIG. 7 is a flowchart of a method 700 for broadcasting messages to players of a game, according to some embodiments. The notification module 304 receives (702) a request from the player to broadcast a message to friends of the player.

The notification module 304 identifies (704) the friends of the player. For example, the notification module 304 may query the game server 104 and the game server 106 to identify friends of the player. Alternatively or additionally, the notification module 304 may identify friends of the player using a profile of the player (e.g., a profile of the player on a social networking website, a profile of the player on the game server 104 and/or the game server 106).

The notification module 304 generates (706) a notification for the message for each friend of the player, the notification for the message to be displayed in a user interface of a game played by each respective player. For example, the notification for the message may be displayed in any and/or all of the games played by each respective player regardless of whether the respective players are existing players of the game for which the message was generated.

Example Machine

Figure 8:
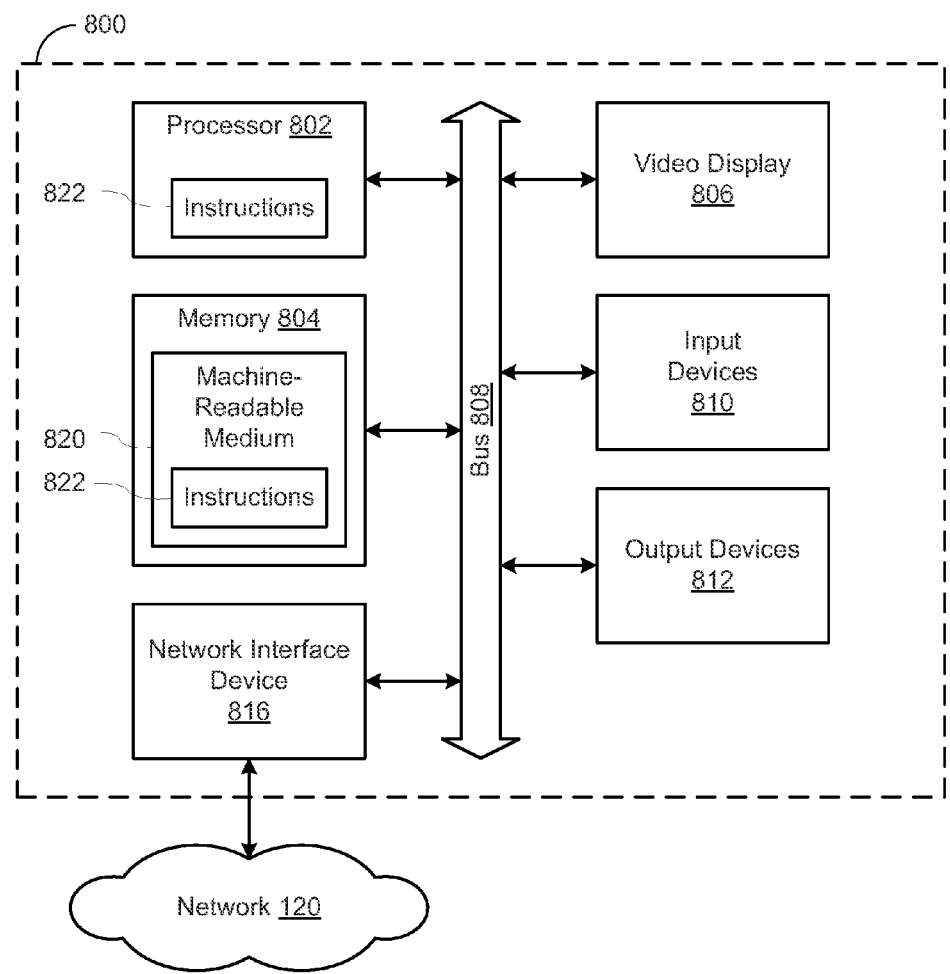
FIG. 8 is a block diagram illustrating an example machine for performing the methodologies described herein, according to some embodiments.

FIG. 8 depicts a block diagram of a machine in the example form of a computer system 800 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment or as a peer machine in a peer-to-peer (or distributed) network environment. The computer system 800 may include, but is not limited to, a desktop computer system, a laptop computer system, a server, a mobile phone, a smart phone, a personal digital assistant (PDA), a gaming console, a portable gaming console, a set top box, a camera, a printer, a television set, or any other electronic device.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computer system 800 includes a processor 802 (e.g., a central processing unit (CPU), a graphics processing unit (GPU) or both), and memory 804, which communicate with each other via bus 808. Memory 804 includes volatile memory devices (e.g., DRAM, SRAM, DDR RAM, or other volatile solid state memory devices), non-volatile memory devices (e.g., magnetic disk memory devices, optical disk memory devices, flash memory devices, tape drives, or other non-volatile solid state memory devices), or a combination thereof. Memory 804 may optionally include one or more storage devices remotely located from the computer system 800. The computer system 800 may further include a video display unit 806 (e.g., a plasma display, a liquid crystal display (LCD) or a cathode ray tube (CRT)). The computer system 800 also includes input devices 810 (e.g., keyboard, mouse, trackball, touchscreen display, etc.), output devices 812 (e.g., speakers), and a network interface device 816. The aforementioned components of the computer system 800 may be located within a single housing or case (e.g., as depicted by the dashed lines in FIG. 8). Alternatively, a subset of the components may be located outside of the housing. For example, the video display unit 806, the input devices 810, and the output devices 812 may exist outside of the housing, but be coupled to the bus 808 via external ports or connectors accessible on the outside of the housing.

Memory 804 includes a machine-readable medium 820 on which is stored one or more sets of data structures and instructions 822 (e.g., software programs) embodying or utilized by any one or more of the methodologies or functions described herein. The one or more sets of data structures may store data. Note that a machine-readable medium refers to a storage medium that is readable by a machine (e.g., a computer-readable storage medium). The data structures and instructions 822 may also reside, completely or at least partially, within memory 804 and/or within the processor 802 during execution thereof by computer system 800, with memory 804 and processor 802 also constituting machine-readable, tangible media.

The data structures and instructions 822 may further be transmitted or received over a network 120 via network interface device 816 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code and/or instructions embodied on a machine-readable medium or in a transmission signal) or hardware modules. A hardware module is a tangible unit capable of performing certain operations and may be configured or arranged in a certain manner. In example embodiments, one or more computer systems (e.g., the computer system 800) or one or more hardware modules of a computer system (e.g., a processor 802 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a processor 802 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a processor 802 configured using software, the processor 802 may be configured as respective different hardware modules at different times. Software may accordingly configure a processor 802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 802 that are temporarily configured (e.g., by software, code, and/or instructions stored in a machine-readable medium) or permanently configured to perform the relevant operations. Whether temporarily or permanently configured, such processors 802 may constitute processor-implemented (or computer-implemented) modules that operate to perform one or more operations or functions. The modules referred to herein may, in some example embodiments, comprise processor-implemented (or computer-implemented) modules.

Moreover, the methods described herein may be at least partially processor-implemented (or computer-implemented) and/or processor-executable (or computer-executable). For example, at least some of the operations of a method may be performed by one or more processors 802 or processor-implemented (or computer-implemented) modules. Similarly, at least some of the operations of a method may be governed by instructions that are stored in a computer readable storage medium and executed by one or more processors 802 or processor-implemented (or computer-implemented) modules. The performance of certain of the operations may be distributed among the one or more processors 802, not only residing within a single machine, but deployed across a number of machines. In some example embodiments, the processors 802 may be located in a single location (e.g., within a home environment, an office environment or as a server farm), while in other embodiments the processors 802 may be distributed across a number of locations.

While the embodiment(s) is (are) described with reference to various implementations and exploitations, it will be understood that these embodiments are illustrative and that the scope of the embodiment(s) is not limited to them. In general, the embodiments described herein may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the embodiment(s).

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A computer-implemented method for providing notifications to players of games, comprising:
   receiving an identifier for a first player of a first game;
      while the first player is playing the first game on a device of the first player, the first game being displayed on the device via a user interface for the first game:
         receiving a request from a second player currently playing a second game not previously accessed by the first player to create a session of the second game between the first and second player, the first game different than the second game;
         determining, by one or more processors, a display order for a plurality of notifications, the display order based at least on the first player not being an existing player of the second game;
         creating an account for the first player in the second game;
         generating a first notification based on the request from the second player;

transmitting, using one or more processors, the first notification to the device of the first player for display according to the display order within the first game;

receiving a first request to access the first notification from the first player, the first request to access the first notification received within the first game and further including a request to participate in the second game; and based on receipt of the first request to access:

initializing a state of the second game for the account for the first player to join the session of the second game being played by the second player.

2. The computer-implemented method of claim 1, further comprising:

receiving a request from a third player currently playing a third game not previously accessed by the first player to create a session of the third game between the first and third player an account for the first player in a third game, the third game different than the first and second game;

creating an account for the first player in the third game;

generating a second notification based on the request from the third player; and transmitting the second notification to the device of the first player for concurrent display of the second notification and the first notification according to the display order within the first game.

3. The computer-implemented method of claim 2, wherein the first player is not an existing player of the third game.

4. The computer-implemented method of claim 2, wherein determining a display order for a plurality of notifications, the method further comprises:

determining the display order of the first and second notifications based on at least one ranking factor additional to the first player not being an existing player of the second game and not being an existing player of the third game, the first and second notifications to be displayed within the first game in the user interface according to the display order.

5. The computer-implemented method of claim 4, wherein the at least one ranking factor is selected from the group consisting of:

a release date of the second game;

a number of actions to be performed by the first player in the second game;

ages of the notifications;

whether the notifications are associated with a friend of the first player;

a number of actions to be performed by the first player with respect to the second game;

a a number of players that play the second game; and a number of friends of the player that play the second game.

6. The computer-implemented method of claim 2, wherein the first game, the second game and the third game are network-based games played via a social networking website.

7. The computer-implemented method of claim 2, wherein the first game, the second game and the third game are asynchronous multiplayer games.

8. The computer-implemented method of claim 1, wherein the identifier for the first player is a social network identifier for the first player.

9. The computer-implemented method of claim 1, wherein the device for the first player is a mobile device.

10. A system to provide notifications to players of games, comprising:

a processor-implemented authentication module configured to receive an identifier for a first player of a first game; and a processor-implemented notification module configured to:

while the first player is playing the first game on a device of the first player, the first game being displayed on the device via a user interface for the first game:

receiving a request from a second player currently playing a second game not previously accessed by the first player to create a session of the second game between the first and second player, the first game different than the second game;

determine a display order for a plurality of notifications, the display order based at least on the first player not being an existing player of the second game;

create an account for the first player in the second game;

generate a first notification based on the request from the second player;

transmit, using one or more processors, the first notification to the device of the first player for display within the first game;

receive a first request to access the first notification from the first player, the first request to access the first notification received within the first game and further including a request to participate in the second game; and based on receipt of the first request to access, initialize a state of the second game for the account for the first player to join the session of the second game being played by the second player.

11. A non-transitory computer readable storage medium storing at least one program that, when executed by at least one processor, causes the at least one processor to perform operations comprising:

receiving an identifier for a first player of a first game;

while the first player is playing the first game on a device of the first player, the first game being displayed on the device via a user interface for the first game:

receiving a request from a second player currently playing a second game not previously accessed by the first player to create a session of the second game between the first and second player, the first game different than the second game;

determining a display order for a plurality of notifications, the display order based at least on the first player not being an existing player of the second game;

creating an account for the first player in the second game;

generating a first notification based on the request from the second player;

transmitting, using one or more processors, the first notification to the device of the first player for display within the first game;

receiving a first request to access the first notification from the first player, the first request to access the first notification received within the first game and further including a request to participate in the second game; and based on receipt of the first request to access, initialize a state of the second game for the account for the first player to join session of the second game being played by the second player.

* * * * *